Oct. 11, 1960

W. WADE 2,955,425

GAS TURBINE ENGINE

Filed June 21, 1956

INVENTOR
*WALLACE WADE,*

*Linton and Linton*

ATTORNEYS

Oct. 11, 1960 W. WADE 2,955,425
GAS TURBINE ENGINE
Filed June 21, 1956 4 Sheets-Sheet 2

INVENTOR
WALLACE WADE,
BY Linton and Linton
ATTORNEYS

Oct. 11, 1960
W. WADE
2,955,425
GAS TURBINE ENGINE
Filed June 21, 1956
4 Sheets-Sheet 3
FIG. 3
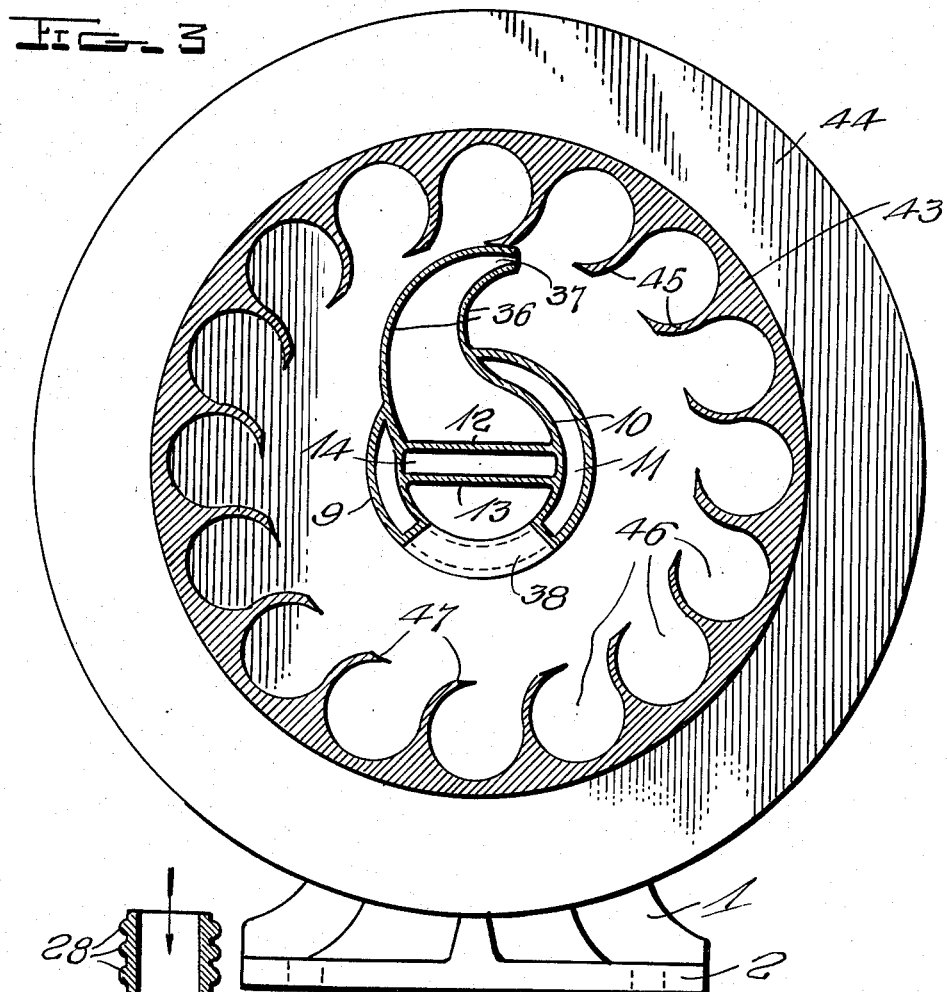
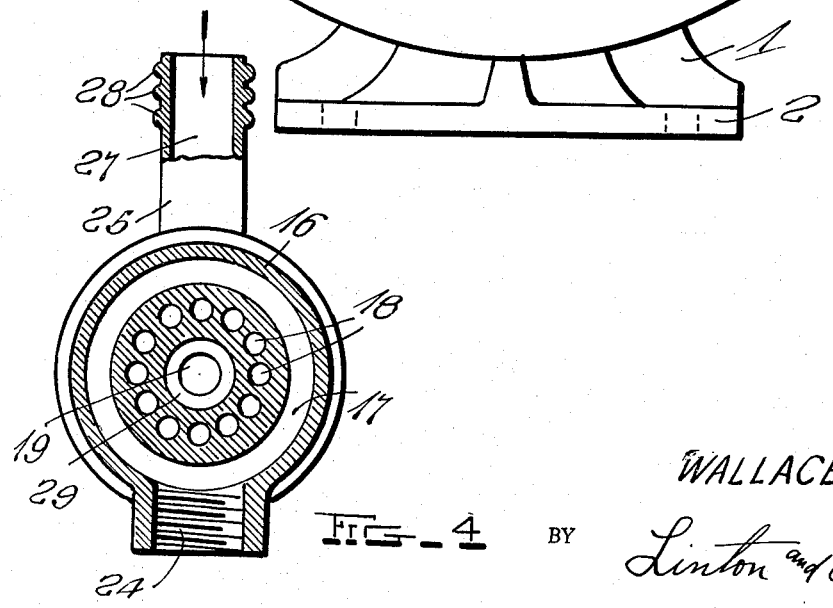
FIG. 4
INVENTOR
WALLACE WADE,
BY Linton and Linton
ATTORNEYS

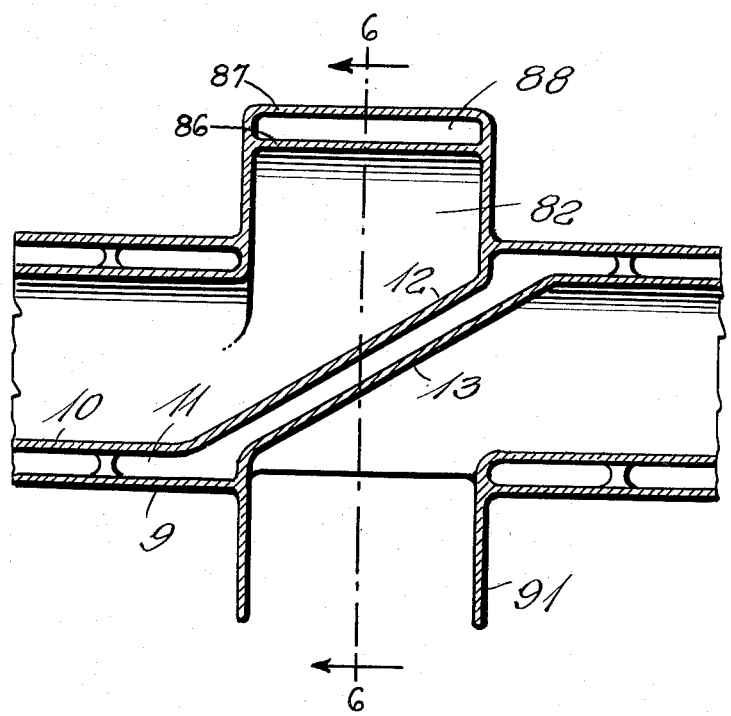
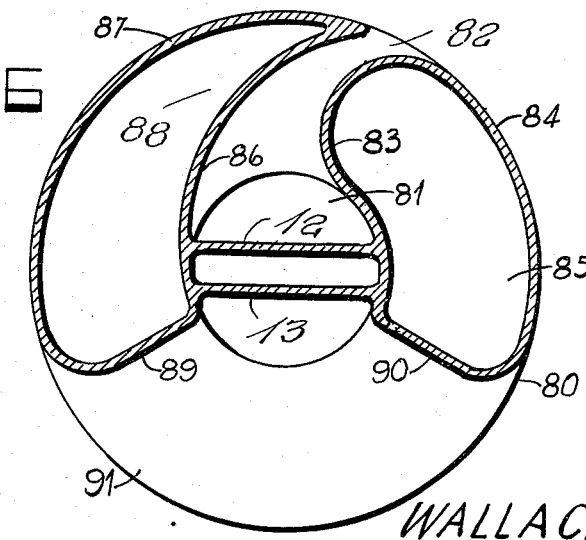

United States Patent Office 2,955,425
Patented Oct. 11, 1960

2,955,425

GAS TURBINE ENGINE

Wallace Wade, 3225 Palk Ave., Ogden, Utah

Filed June 21, 1956, Ser. No. 592,926

2 Claims. (Cl. 60—39.36)

The present invention is related to driving turbines and is more particularly directed to a fixed shaft turbine utilizing a combustible fuel.

The principal object of the present invention is to provide in a single unit a driving engine having a fixed shaft and a rotating casing upon which is mounted gearing for driving purposes.

A further and important object of the present invention is to provide a novel structure for a turbine engine which is economical to produce, can be readily and easily assembled and disassembled as required and can be used in interconnected multiples or in a number of interconnected stages.

A still further object of the invention is to provide a unitary turbine engine using combustible fuel for producing high temperature gases and which engine will maintain the elements thereof relatively cool during the operation of the same.

Further objects of the invention will be in part obvious and in part pointed out in the following description of the accompanying drawings, wherein Fig. 1 is a side elevation of the present turbine engine partly in section showing the internal arrangement thereof.

Fig. 3 is an enlarged cross sectional view taken on line 3—3 of Fig. 1.

Fig. 4 is a cross sectional view taken on line 4—4 of Fig. 1, and

Fig. 5 is an enlarged cross sectional view of a modified portion of the shaft of the engine including the nozzle thereof.

Figure 1:
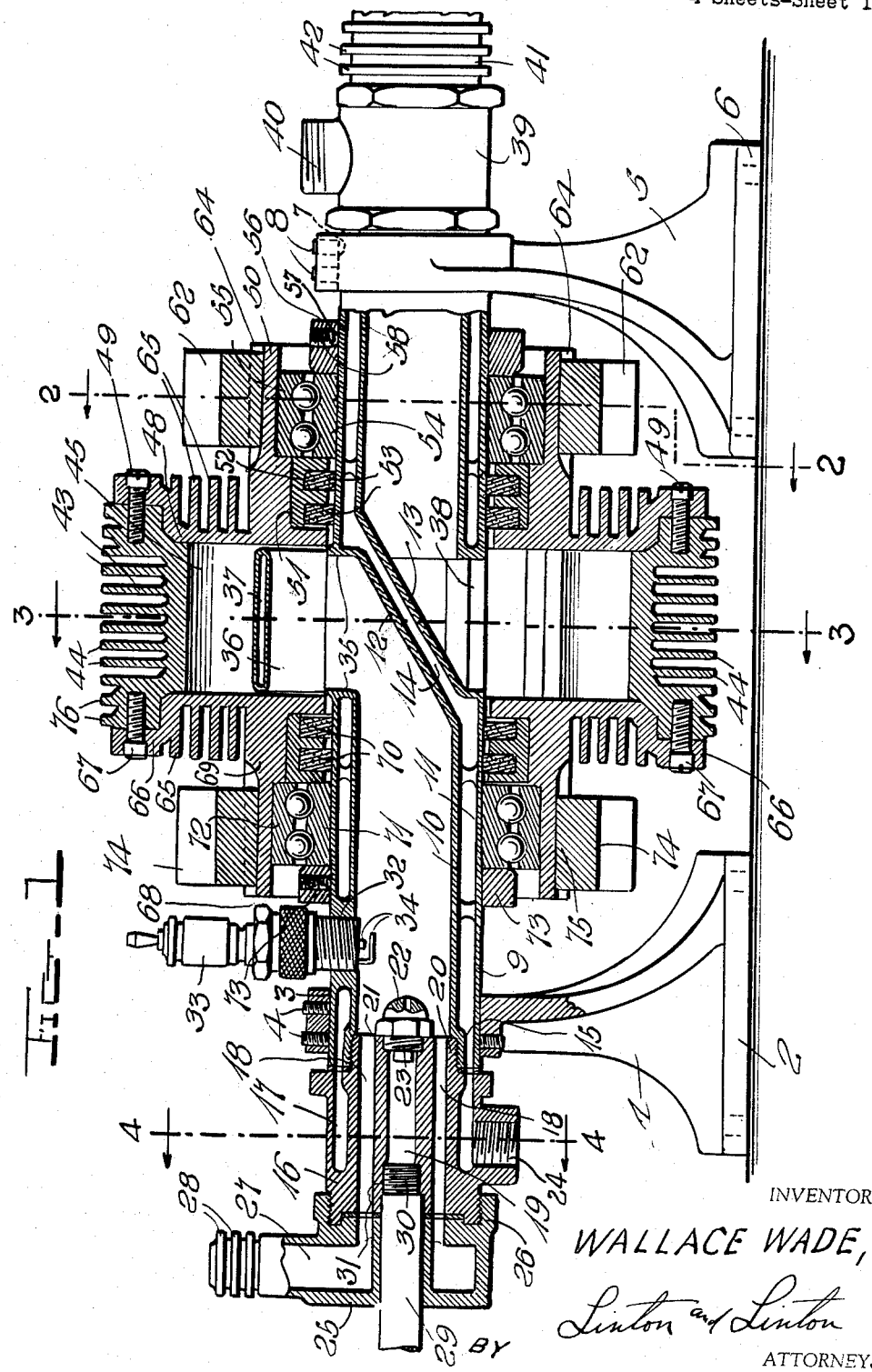
Figure 2:
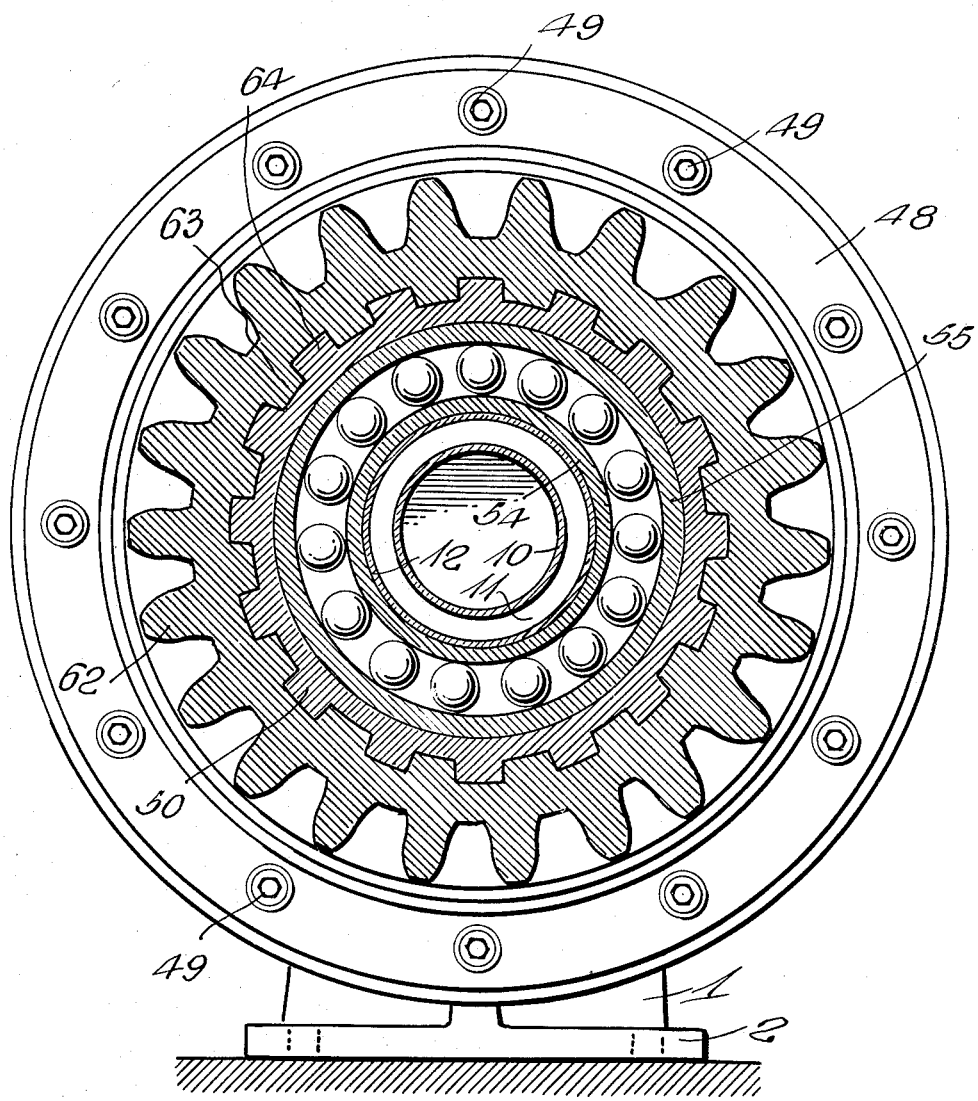
Fig. 2 is an enlarged cross sectional view taken on line 2—2 of Fig. 1.

And Fig. 6 is a longitudinal section view taken on line 6—6 of Fig. 5.

Referring now more particularly to the accompanying drawing wherein like and corresponding parts are indicated by similar reference characters, numeral 1 refers to a standard having a base 2, a lateral opening 3 and fixing screws 4 extending to said opening. A second standard 5 has a base 6 lateral opening 7 and fixing screws 8 extending to said opening.

An elongated tubular shaft 9 extends through openings 3 and 7 of said standards and is held in a fixed position therein by screws 4 and 8 bearing against the periphery of said shaft. Said shaft has an inner wall 10 concentric therewith, but spaced therefrom forming a coolant passage 11. A deflector wall 12 extends diagonally across the bore of said inner wall, while a second deflector plate 13 extends parallel to said first mentioned plate but is spaced therefrom forming a passage 14 which is in communication with said coolant passage 11. Said plates 12 and 13 extend completely across the inner bore provided by wall 10 completely closing the same.

Wall 10 has a threaded end portion 15 having a similarly threaded end of a fuel admission tube 16 in threaded engagement therewith. Said tube 16 has an open end annular recess 17 which is in communication with the coolant passageway 11. An annular series of longitudinally extending openings 18 are also provided through said tube surrounding and concentric with an axial opening 19 also extending through said tube longitudinally thereof. Said tube further has a threaded peripheral end portion 20.

A central bore 19 of said tube 16 is threaded at one end as at 21 for receiving a nozzle 22 having threads 23 in engagement therewith.

A laterally extending opening 24 is provided in the side of said tube 16 and communicates with recess 17 and is capable of being attached to a source of coolant under pressure.

An elbow 25 has a threaded opening 26 for being in threaded engagement with the threads 20 of said tube 16 and further has a passageway 27 in communication with the annular series of openings 18 of said tube. Ribs 28 are formed upon the upper end of said elbow for connection to a source of compressed air.

A fuel tube 29 extends through said elbow and has threads 30 being in threaded engagement with the threads 31 provided in the end portion of passageway 19 of tube 16.

Shaft 9 and inner wall 10 have a threaded passageway 32 extending laterally thereof into which is detachably mounted an ignition or glow plug 33 having electrodes 34 and which glow plug can be connected to a source of electrical current for heating said electrodes or providing a spark therebetween.

Said shaft 9 and wall 10 have a port provided above deflector plate 12 by a lateral wall 35 which together with a pair of curved side walls 36 form a nozzle having an open end passageway 37 in communication with the inner bore of said shaft.

Wall 10 and shaft 9 have an exhaust port provided below deflector plate 13 by a wall 38 closing the passageway 11 and extending between shaft 9 and wall 10.

Upon the end of shaft 9 beyond standard 5, a tube 39 is threadedly attached to said shaft and has a passageway in communication with passageway 11 and extending outwardly through a threaded opening 40 in a manner similar to recess 17 and passageway 24 of tube 16. Said tube 39 further has a central opening in communication with the inner bore of said shaft which is also in communication with an exhaust pipe 41 threadedly engaging the end portion of said tube 39 and having cooling fins 42.

An annular turbine head 43 has cooling fins 44 extending therearound. Formed with the inner face of said head is a series of curved turbine blades 45 with each pair of blades forming a cylindrical pocket 46, while the free ends 47 of said blades having an arcuate configuration with all of said ends extend on a circle which passes across the upper end of nozzle 36 so that said ends 47 will slidably contact or closely clear the upper end of said nozzle during their movement.

An annular side plate 48 is connected to said head 43 by a series of bolts 49 and has a central hub 50 through the bore of which extends shaft 9. Said hub has a recessed portion 51 in the bore thereof in which is mounted a block 52 having a plurality of sealing rings 53 bearing against the periphery of said shaft 9 preventing the escape of gases therearound. Also in said recess next to said block 52 is an annular ball bearing having an inner race 54 surrounding the periphery of said shaft while its outer race 55 supports said hub.

Ring 56 has a threaded opening 57 with a setscrew 58 in threaded engagement therein and bearing against said shaft 9 for holding said ring against inner race 54 preventing lateral movement thereof.

A tubular driving gear 62 is mounted upon hub 50 and keyed thereto by a plurality of keys 63 formed with the inner bore of said gear and positioned in keyways 64 provided in the periphery of said hub.

Said side plate 48 also has a concentric series of circular cooling fins 65 surrounding said hub.

A second side plate similar to said plate 48 is attached to the opposite side of head 43 by a plurality of bolts 67. Plate 66 has a hub 68 through which extends shaft 9 and is recessed having a block 69 positioned therein from which extends sealing rings 70 bearing against and surrounding the periphery of said shaft preventing the escape of gases thereby. Inner race 71 of an annular ball bearing also surrounds the periphery of shaft 9 and bears against block 69, while the outerrace 72 supports hub 68. A ring 73 is attached to the periphery of shaft 9 in a manner similar to ring 56 and bears against inner race 71 forming a stop against lateral movement thereof.

A tubular gear 74 surrounds said hub and is keyed thereto by a series of keys 75 in the manner similar to gear 62 and hub 50.

In Figs. 5 and 6 of the drawing there is shown a modified nozzle portion for shaft 9 in that in lieu of nozzle 37 shaft 9 is provided with a cylindrical portion extending between side plates 48 and 66 which cylindrical portion 80 is slidably engaged or closely spaced from ends 47 of blades 45. A central bore 81 is in communication with the space provided by wall 10 and has a curved open end passageway 82 extending to the periphery of portion 80. One side of bore 81 and passageway 82 is formed by a wall 83 which extends contiguously from peripheral wall 84 forming a passageway 85 in communication with passageway 11. Similarly, a wall 86 forms the opposite side of passageway 81 and passageway 82 and extends contiguously from peripheral wall 87 which also provides a passageway 88 in communication with passageway 11. Wall 89 connects walls 86 and 87, while wall 90 connects walls 83 and 84, while counter balancing plates 91 extend downwardly from said walls 89 and 90.

In the operation of the present turbine engine air from a source of compressed air (not shown) is conducted to elbow 25 and through passageways 27 and 18 through to the bore of shaft 9. A combustible fuel such as kerosene, gasoline or high grade fuel oil or the like is forced through pipe 29 in a continuous stream through passageway 19 and through the nozzle 22 whose restricted opening produces a fine mist of fuel and mixes the same with the surrounding air from openings 18. Heat from the electrodes 34 ignite the swirling fuel mixture passing therebetween producing a jet of gases which strike and are laterally deflected by a plate 12 through passageway 37 of the nozzle whereupon rapidly moving mixture will strike the face of the rotor blade facing the outlet of said nozzle causing the blade to move pressing the next blade in the series thereof to said nozzle which in turn will be caused to move until head 43 is given a rapid rotation as a result thereof. As the pockets 46 proceed towards exhaust port 38, the gases are swirling therein and will move from said pockets through the exhaust port and outwardly through the exhaust pipe 41.

The rotating head 43 carries side plates 48 and 66 therewith and therefore gears 62 and 74. Gear 74 can be connected to the compressor for the air, to the fuel pump for feeding fuel to pipe 29, to an electric generator such as a magneta for supplying current to the glow plug 33 as well as for the driving of a pump for a coolant. Gear 62 can be connected in any conventional manner to other devices, gears and the like for driving the same or for having a plurality of the present turbine engines connected to a single drive shaft.

The rotation of head 43 and plates 48 and 66 will through their fins 44, 65 cause these members to be maintained relatively cool and to dissipate heat from blades 45.

A coolant under pressure could be supplied to opening 24 whereupon it would move through passageways 17, 11, 14 and out through outlet 40 and back through a radiator or the like and pump (neither of which are shown) but which can be utilized for cooling and circulating the same. Thus, shaft 9, walls 10 and plates 12 and 13 can be maintained relatively cool.

In the modification of Fig. 5, the coolant for passageway 11 passes through passageways 85 and 88 for maintaining passageway 82 reltaively cool throughout its length.

It is to be appreciated that exhaust pipe 41 can be connected to other units such as one end of pipe 9 in lieu of tube 16 whereupon the exhaust gases which have considerable remaining energy can be utilized for driving additional turbines of the present or like arrangement.

In order to exhaust the gases properly, particularly as regards the modified form of nozzle shown in Fig. 5, the velocities of head 43 should be very close to the terminal velocities of the gases leaving nozzle 82. The path of the gases direct the same towards the center of the turbine and the length of this path should exceed the length of wall 84 as the turbine will have then rotated through a sufficient arc to allow the gases to exhaust through the exhaust port.

The present invention is capable of considerable modification and such changes thereto as come within the scope of the appended claims are deemed to be a part of the present application.

I claim:

1. A turbine engine comprising a fixedly supported tubular shaft, a closure for one end of said shaft, means for supplying a combustible mixture of fuel to the bore of said shaft, means for igniting said fuel mixture within said shaft bore, a housing rotatably mounted on said shaft having a cylindrical interior cavity, an annular series of similarly curved blades connected to and extending radially within said housing cavity, said shaft having passageways throughout the length thereof with inlet and outlet openings for the passage of a coolant, said shaft having an enlarged cylindrical portion extending within said housing cavity with its periphery being in sliding contact with said blades, walls extending longitudinally within said cylindrical portion providing passageways in communication with said aforementioned shaft passageways and a separate radially extending single passageway therebetween in communication with the bore of said shaft and opening at the periphery of said cylindrical portion for guiding said ignited fuel mixture to said blades, spaced apart plates positioned across the bore of said shaft within said cylindrical portion with the space therebetween being in communication with said shaft coolant passageway, one of said plates being positioned for directing the ignited fuel from said shaft bore to said separate single passage, said shaft having an exhaust opening within said cylindrical portion, said cylindrical portion having an open side opposite said separate single passageway placing said exhaust opening in communication with said housing cavity, and the other of said plates being positioned for directing gases from said exhaust opening through said shaft bore to the open end thereof.

2. A turbine engine comprising a fixedly supported tubular shaft, a plate extending angularly across the bore of said shaft and dividing said bore into a combustion passage and an exhaust passage, means for closing the end of said shaft having said combustion passage and introducing a combustible mixture of fuel into said combustion passage, means for igniting said combustible mixture in said combustion passage, a single bore nozzle connected to and extending laterally of said shaft having its bore in communication with said combustion passage above said plate, an annular housing rotatably mounted on said shaft and having said nozzle positioned therein, an annular series of blades carried by said housing and positioned forming pockets between each pair of said blades and carrying gases from said nozzle, said shaft having an exhaust port in the side thereof below said plate in communication with said exhaust passage for receiving and exhausting gases from said blade pockets, said shaft also having passageways throughout the length thereof with inlet and outlet openings for the passage of a coolant for cooling said shaft and said plate having a passageway in communication with said shaft passageways for also receiving said coolant and being cooled thereby.

References Cited in the file of this patent

UNITED STATES PATENTS

| | | |
|---|---|---|
| 1,000,882 | Atwell | Aug. 15, 1911 |
| 2,201,575 | Corneil et al. | May 21, 1940 |
| 2,253,005 | Wittich | Aug. 19, 1941 |
| 2,531,581 | Moyer | Nov. 28, 1950 |